US011556016B2

(12) United States Patent
Park et al.

(10) Patent No.: US 11,556,016 B2
(45) Date of Patent: Jan. 17, 2023

(54) 3D DISPLAY APPARATUS HAVING LENTICULAR LENSES

(71) Applicant: LG Display Co., Ltd., Seoul (KR)

(72) Inventors: Ju-Seong Park, Gimpo-si (KR); Hoon Kang, Goyang-si (KR); Myung-Soo Park, Gimpo-si (KR); Dong-Yeon Kim, Seoul (KR); Young-Min Kim, Goyang-si (KR); Se-Wan Oh, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 88 days.

(21) Appl. No.: 17/132,498

(22) Filed: Dec. 23, 2020

(65) Prior Publication Data

US 2021/0199984 A1 Jul. 1, 2021

(30) Foreign Application Priority Data

Dec. 31, 2019 (KR) .......................... 10-2019-0180182

(51) Int. Cl.
*G02B 30/27* (2020.01)
*G02B 3/00* (2006.01)

(52) U.S. Cl.
CPC ............. *G02B 30/27* (2020.01); *G02B 3/005* (2013.01)

(58) Field of Classification Search
CPC .... G02B 5/201; G02B 3/0006; G02B 3/0037; G02B 3/005; G02B 30/27; G02B 30/26; G02B 2207/123; G02B 30/30; G02B 3/0043; G02B 30/00; G02F 1/1335
See application file for complete search history.

(56) References Cited

U.S. PATENT DOCUMENTS

| 11,336,885 | B2* | 5/2022 | Kim | ..................... H04N 13/305 |
| 2009/0244270 | A1 | 10/2009 | Takagi et al. | |
| 2014/0133022 | A1* | 5/2014 | Kim | ....................... G02B 30/29 359/463 |
| 2016/0021367 | A1* | 1/2016 | Yoon | ........................ G09G 3/03 348/59 |
| 2021/0274153 | A1* | 9/2021 | Cho | ..................... H04N 13/305 |

FOREIGN PATENT DOCUMENTS

| CN | 105374325 A | 3/2016 |
| CN | 108400703 A | 9/2018 |
| JP | 2008-33073 A | 4/2008 |

* cited by examiner

*Primary Examiner* — Jade R Chwasz

(74) *Attorney, Agent, or Firm* — Birch, Stewart, Kolasch & Birch, LLP

(57) ABSTRACT

A three dimensional (3D) display apparatus can include lenticular lenses between a display panel and a viewing angle control film. The display panel can have a curvature. The viewing angle control film can include a plurality of light-blocking patterns between a first control substrate and a second control substrate. A pitch and a height of the plurality of light-blocking patterns can be determined by a curvature radius of the lenticular lenses, a distance between the viewing angle control film and a set viewing region, and a length of the display panel corresponding to the set viewing region. Thus, in the 3D display apparatus, the quality of 3D images provided to a user can be improved.

9 Claims, 5 Drawing Sheets

3D DISPLAY APPARATUS HAVING LENTICULAR LENSES

CROSS-REFERENCE TO RELATED APPLICATIONS

This application claims the priority benefit of Korean Patent Application No. 10-2019-0180182, filed on Dec. 31, 2019 in the Republic of Korea, the entire contents of which are hereby expressly incorporated by reference as if fully set forth herein into the present application.

BACKGROUND OF THE INVENTION

Field of the Invention

The present invention relates to a three-dimensional (3D) display apparatus in which lenticular lenses are disposed on a display panel.

Discussion of the Related Art

A display apparatus can provide a two-dimensional (2D) image and/or a 3D image to a user. For example, the display apparatus can be a 3D display apparatus in which lenticular lenses are disposed on a display panel. The display panel can realize an image provided to the user. For example, the display panel can include a plurality of pixel regions.

Each of the pixel regions can display a specific color. For example, a light-emitting device can be disposed in each pixel region. The light-emitting device can emit light displaying a specific color. For example, the light-emitting device can include a light-emitting layer between a first electrode and a second electrode.

The 3D display apparatus can realize the 3D image provided to the user by superimposing light emitted from each pixel region of the display panel in a set viewing region using the lenticular lenses. The 3D display apparatus can further include a viewing angle control film on the lenticular lenses. However, the light passing through the lenticular lenses and the viewing angle control film which are disposed on the display panel having a curvature can be emitted in an outward direction of the set viewing region. Thus, in the 3D display apparatus, a repetitive image can be provided to the user.

SUMMARY OF THE INVENTION

Accordingly, the present invention is directed to a 3D display apparatus that substantially obviates one or more problems due to limitations and disadvantages of the related art.

An object of the present invention is to provide a 3D display apparatus capable of improving the quality of a 3D image realized in a set viewing region by lenticular lenses and a viewing angle control film which are disposed on a display panel having a curvature.

Another object of the present invention is to provide a 3D display apparatus capable of preventing the generation of a repetitive image by limiting a viewing angle of light emitted from a display panel having a curvature.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, there is provided a 3D display apparatus comprising a display panel. The display panel has a curvature. A viewing angle control film is disposed on the display panel. Lenticular lenses are disposed between the display panel and the viewing angle control film. The viewing angle control film includes a plurality of light-blocking patterns between a first control substrate and a second control substrate. A height and a pitch of the plurality of light-blocking patterns satisfy the following equation:

$$\frac{p}{h} = \frac{(R_2 + d) \times \tan\left(\frac{L_1}{2 \times R_2}\right)}{d}$$

wherein, p is a pitch of the plurality of light-blocking patterns, h is a height of each of the plurality light-blocking patterns, $R_2$ is a curvature radius of the lenticular lenses, d is a distance between the viewing angle control film and a set viewing region, and $L_1$ is a length of the display panel corresponding to the set viewing region.

The lenticular lenses and the viewing angle control film can have the same curvature as the display panel.

An optical element can be disposed between the display panel and the lenticular lenses. A display adhesive layer can be disposed between the display panel and the optical element. A lens adhesive layer can be disposed between the optical element and the lenticular lenses.

The display adhesive layer can be in contact with the display panel and the optical element. The lens adhesive layer can be in contact with the optical element and the lenticular lenses.

The lens adhesive layer can include a material different from the display adhesive layer.

Each of the plurality of light-blocking patterns can be in contact with the first control substrate and the second control substrate.

An air-gap can be disposed between the lenticular lenses and the viewing angle control film.

The air-gap can overlap a boundary of the lenticular lenses.

An edge of the display panel and an edge of the viewing angle control film can be in contact with a fixing element.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
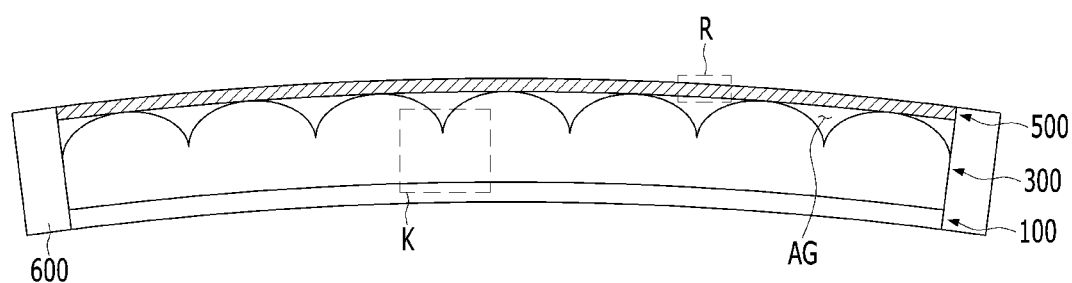
FIG. 1 is a view schematically showing a 3D display apparatus according to an embodiment of the present invention.

Hereinafter, details related to the above objects, technical configurations, and operational effects of the embodiments of the present invention will be clearly understood by the following detailed description with reference to the drawings, which illustrate some embodiments of the present invention. Here, the embodiments of the present invention are provided in order to allow the technical sprit of the present invention to be satisfactorily transferred to those skilled in the art, and thus the present invention can be embodied in other forms and is not limited to the embodiments described below.

In addition, the same or extremely similar elements can be designated by the same reference numerals throughout the specification, and in the drawings, the lengths and thickness of layers and regions can be exaggerated for convenience. It will be understood that, when a first element is referred to as being "on" a second element, although the first element can be disposed on the second element so as to come into contact with the second element, a third element can be interposed between the first element and the second element.

Here, terms such as, for example, "first" and "second" can be used to distinguish any one element with another element and may not define order. However, the first element and the second element can be arbitrary named according to the convenience of those skilled in the art without departing the technical sprit of the present invention.

The terms used in the specification of the present invention are merely used in order to describe particular embodiments, and are not intended to limit the scope of the present invention. For example, an element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiments

Figure 2A:
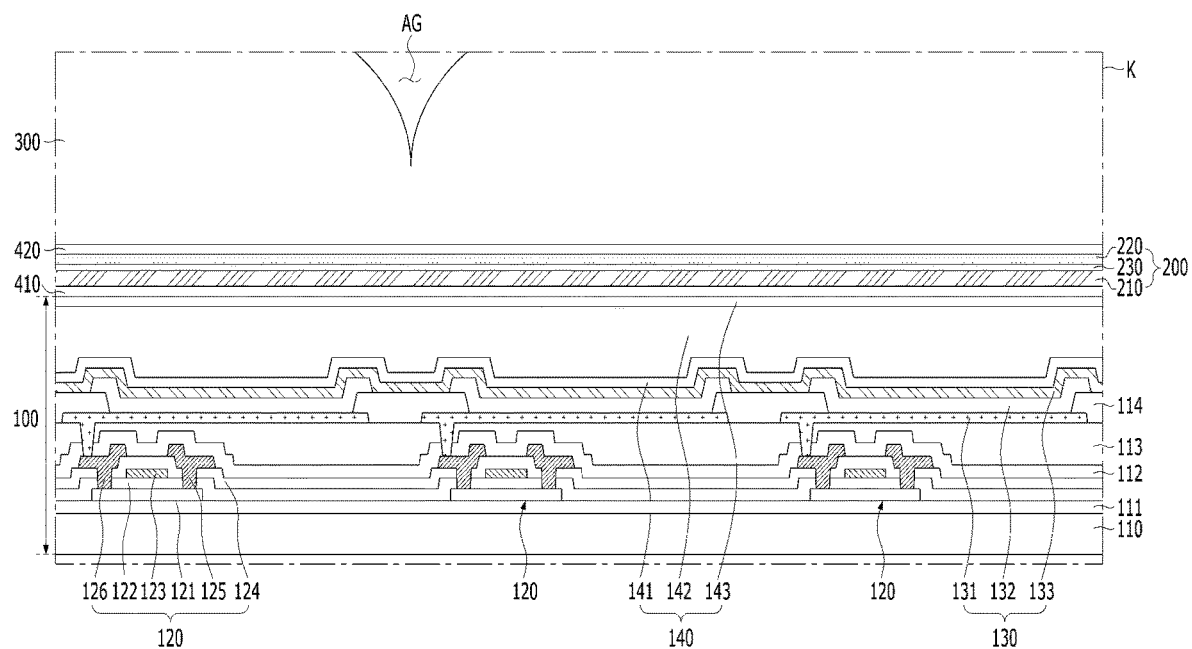
FIG. 2A is an enlarged view of K region in FIG. 1.
Figure 2B:
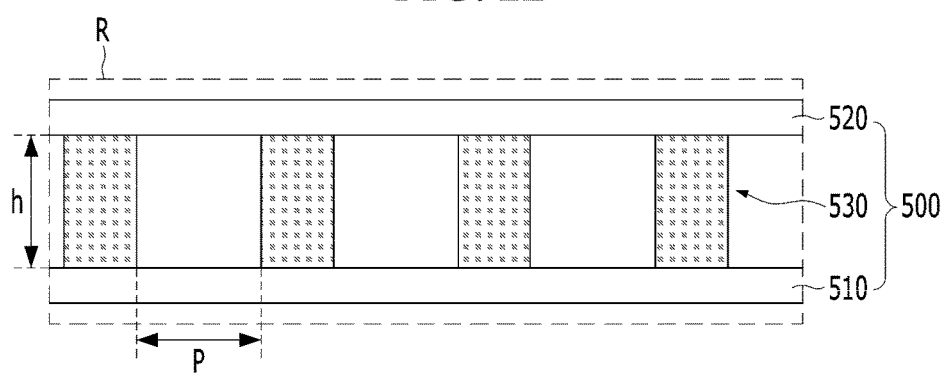
FIG. 2B is an enlarged view of R region in FIG. 1.
Figure 2C:
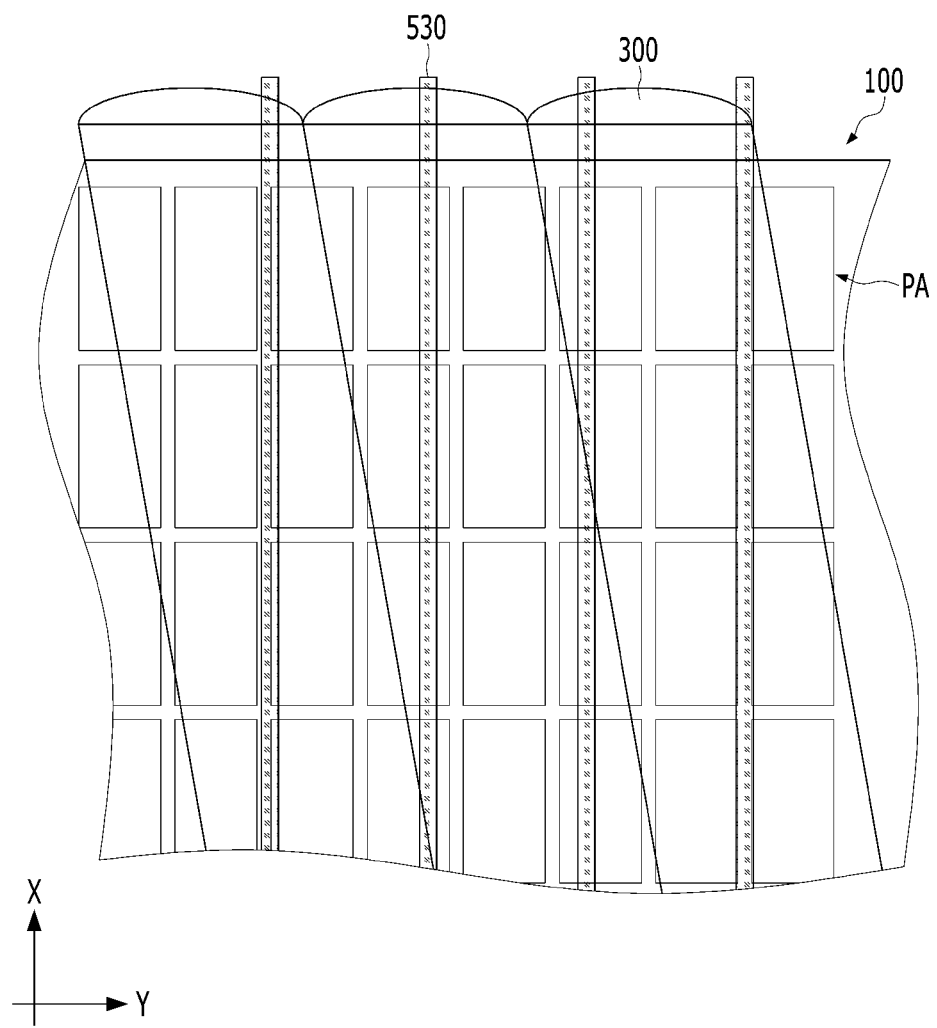
FIG. 2C is a view partially showing a plane of the 3D display apparatus according to the embodiment of the present invention.

FIG. 1 is a view schematically showing a 3D display apparatus according to an embodiment of the present invention. FIG. 2A is an enlarged view of K region in FIG. 1. FIG. 2B is an enlarged view of R region in FIG. 1. FIG. 2C is a view partially showing a plane of the 3D display apparatus according to the embodiment of the present invention. All the components of the 3D display apparatus according to all embodiments of the present invention are operatively coupled and configured.

Referring to FIGS. 1 and 2A to 2C, the 3D display apparatus according to the embodiment of the present invention can include a display panel 100. The display panel 100 can realize an image provided to a user. For example, the display panel 100 can include a plurality of pixel regions PA. The pixel regions PA can be disposed side by side in a first direction X and a second direction Y perpendicular to the first direction X.

Each of the pixel regions PA can display a specific color. For example, each of the pixel regions PA can include a light-emitting device 130. The light-emitting device 130 can emit light displaying a specific color. For example, the light-emitting device 130 can include a first electrode 131, a light-emitting layer 132 and a second electrode 133, which are sequentially stacked on a device substrate 110. The device substrate 110 can include an insulating material. For example, the device substrate 110 can include glass or plastic.

The first electrode 131 can include a conductive material. The first electrode 131 can include a material having high reflectance. For example, the first electrode 131 can include a metal, such as aluminum (Al) and silver (Ag). The first electrode 131 can have a multi-layer structure. For example, the first electrode 131 can have a structure in which the reflective electrode formed of metal is disposed between transparent electrodes formed of a transparent conductive material, such as ITO and IZO.

The light-emitting layer 132 can generate light having luminance corresponding to a voltage difference between the first electrode 131 and the second electrode 133. For example, the light-emitting layer 132 can include an emission material layer (EML) having an emission material. The emission material can include an organic material, an inorganic material or a hybrid material. For example, the display panel 100 of the 3D display apparatus according to the embodiment of the present invention can be an OLED (organic light emitting diode) panel having the light-emitting layer 132 formed of an organic material.

The second electrode 133 can include a conductive material. The second electrode 133 can include a material different from the first electrode 131. For example, the second electrode 133 can be a transparent electrode formed of a transparent conductive material, such as ITO and IZO. Thus, in the 3D display apparatus according to the embodiment of the present invention, the light generated by the light-emitting layer 132 can be emitted to outside through the second electrode 133 in each pixel region PA of the display panel 100.

The light-emitting device 130 can further include an emitting function layer between the first electrode 131 and the light-emitting layer 132 and/or between the light-emitting layer 132 and the second electrode 133. The emitting function layer can include at least one of a hole injection layer (HIL), a hole transmitting layer (HTL), an electron transmitting layer (ETL) and an electron injection layer (EIL). Thus, in the display panel 100 of the 3D display apparatus according to the embodiment of the present invention, the efficiency of the light-emitting device 130 can be improved.

Each of the pixel regions PA can include a driving circuit electrically connected to the light-emitting device 130. The driving circuit can supply a driving current corresponding to a data signal according to a scan signal to the light-emitting device 130. For example, the driving circuit can include a thin film transistor 120. The thin film transistor 120 can include a semiconductor pattern 121, a gate insulating layer 122, a gate electrode 123, an interlayer insulating layer 124, a source electrode 125 and a drain electrode 126.

The semiconductor pattern 121 can include a semiconductor. For example, the semiconductor pattern 121 can include silicon. The semiconductor pattern 121 can be an oxide semiconductor. For example, the semiconductor pattern 121 can include a metal oxide, such as IGZO. The semiconductor pattern 121 can include a source region, a drain region and a channel region. The channel region can be disposed between the source region and the drain region. The source region and the drain region can have a lower resistance than the channel region.

The gate insulating layer 122 can be disposed on the semiconductor pattern 122. The gate insulating layer 122 can extend beyond the semiconductor pattern 121. For example, a side surface of the semiconductor pattern 121 can be covered by the gate insulating layer 122. The gate insulating layer 122 can include an insulating material. For example, the gate insulating layer 122 can include silicon oxide (SiO) or silicon nitride (SiN). The gate insulating layer 122 can include a high-K material. For example, the gate insulating layer 122 can include titanium oxide (TiO). The gate insulating layer 122 can have a multi-layer structure.

The gate electrode 123 can be disposed on the gate insulating layer 122. The gate electrode 123 can overlap the channel region of the semiconductor pattern 121. For example, the gate electrode 123 can be insulated from the semiconductor pattern 121 by the gate insulating layer 122. The gate electrode 123 can include a conductive material. For example, the gate electrode 123 can include a metal, such as aluminum (Al), chromium (Cr), copper (Cu), titanium (Ti), molybdenum (Mo) and tungsten (W).

The interlayer insulating layer 124 can be disposed on the gate electrode 123. The interlayer insulating layer 124 can extend beyond the semiconductor pattern 121. For example, a side surface of the gate electrode 123 can be covered by the interlayer insulating layer 124. The interlayer insulating layer 124 can include an insulating material. For example, the interlayer insulating layer 124 can include silicon oxide (SiO).

The source electrode 125 can be disposed on the interlayer insulating layer 124. The source electrode 125 can be electrically connected to the source region of the semiconductor pattern 121. For example, the gate insulating layer 122 and the interlayer insulating layer 124 can include a source contact hole partially exposing the source region of the semiconductor pattern 121. The source electrode 125 can be in direct contact with the source region of the semiconductor pattern 121 at the inside of the source contact hole. The source electrode 125 can include a conductive material. For example, the source electrode 125 can include a metal, such as aluminum (Al), chromium (Cr), copper (Cu), titanium (Ti), molybdenum (Mo) and tungsten (W). The source electrode 125 can include a material different from the gate electrode 123.

The drain electrode 126 can be disposed on the interlayer insulating layer 124. The drain electrode 126 can be electrically connected to the drain region of the semiconductor pattern 121. The drain electrode 126 can be spaced away from the source electrode 125. For example, the gate insulating layer 122 and the interlayer insulating layer 124 can include a drain contact hole partially exposing the drain region of the semiconductor pattern 121. The drain electrode 126 can be in direct contact with the drain region of the semiconductor pattern 121 at the inside of the drain contact hole. The drain electrode 126 can include a conductive material. For example, the drain electrode 126 can include a metal, such as aluminum (Al), chromium (Cr), copper (Cu), titanium (Ti), molybdenum (Mo) and tungsten (W). The drain electrode 126 can include the same material as the source electrode 125. The drain electrode 126 can include a material different from the gate electrode 123.

The driving circuit can be disposed between the device substrate 110 and the first electrode 131 of the light-emitting device 130. For example, the semiconductor pattern 121 of the thin film transistor 120 can be disposed close to the device substrate 110. Thus, in the display panel 100 of the 3D display apparatus according to the embodiment of the present invention, the light emitted from the light-emitting device 130 can be not blocked by the driving circuit.

A buffer layer 111 can be disposed between the device substrate 110 and the driving circuit of each pixel region PA. The buffer layer 111 can prevent pollution due to the device substrate 110 in a process of forming the driving circuit of each pixel region PA. For example, the buffer layer 111 can be disposed between the device substrate 110 and the semiconductor pattern 121 of each driving circuit. The buffer layer 111 can extend beyond the semiconductor patterns 121 of each pixel region PA. For example, an entirely surface of the device substrate 110 toward the driving circuits can be covered by the buffer layer 111. The buffer layer 111 can include an insulating material. For example, the buffer layer 111 can include silicon oxide (SiO) and/or silicon nitride (SiN). The buffer layer 111 can have a multi-layer structure.

A lower passivation layer 112 can be disposed between the driving circuits and the light-emitting devices 130. The lower passivation layer 112 can prevent the damage of the driving circuits due to an external impact and moisture. For example, the lower passivation layer 112 can cover an entirely surface of the driving circuits toward the light-emitting devices 130. The lower passivation layer 112 can extend beyond the source electrode 125 and the drain electrode 126 of each driving circuit. The lower passivation layer 112 can include an insulating material. For example, the lower passivation layer 112 can include silicon oxide (SiO) or silicon nitride (SiN).

An over-coat layer 113 can be disposed between the lower passivation layer 112 and the light-emitting devices 130. The over-coat layer 113 can remove a thickness difference due to the driving circuits. For example, a surface of the over-coat layer 113 opposite to the device substrate 110 can be a flat surface. The over-coat layer 113 can extend along the lower passivation layer 112. The over-coat layer 113 can include an insulating material. The over-coat layer 113 can include a material different from the lower passivation layer 112. For example, the over-coat layer 113 can include an organic material.

The lower passivation layer 112 and the over-coat layer 113 can include electrode contact holes exposing a portion of each thin film transistor 120. Each of the light-emitting devices 130 can be electrically connected to the corresponding thin film transistor 120 through one of the electrode contact holes. For example, the first electrode 131 of each light-emitting device 130 can be in direct contact with the drain electrode 126 of the corresponding thin film transistor 120 at the inside of the corresponding electrode contact hole.

An encapsulating element 140 can be disposed on the light-emitting devices 130. The second electrode 133 of each light-emitting device 130 can be disposed close to the encapsulating element 140. For example, the light-emitting devices 130 can be disposed between the device substrate 110 and the encapsulating element 140. The encapsulating element 140 can prevent the damage of the light-emitting devices 130 due to the external impact and moisture. The encapsulating element 140 can extend beyond the light-emitting devices 130. For example, the light-emitting devices 130 can be covered by the encapsulating element 140.

The encapsulating element 140 can have a multi-layer structure. For example, the encapsulating element 140 can include a first encapsulating layer 141, a second encapsulating layer 142 and a third encapsulating layer 143, which are sequentially stacked on the second electrode 133 of each light-emitting device 130. The first encapsulating layer 141, the second encapsulating layer 142 and the third encapsulating layer 143 can include an insulating material. The second encapsulating layer 142 can include a material different from the first encapsulating layer 141 and the third encapsulating layer 143. For example, the first encapsulating layer 141 and the third encapsulating layer 143 can include an inorganic material, and the second encapsulating layer 142 can include an organic material. Thus, in the display panel 100 of the 3D display apparatus according to the embodiment of the present invention, the permeation of the external moisture can be effectively prevented. The thickness difference due to the light-emitting devices 130 can be removed by the second encapsulating layer 142. For example, a surface of the third encapsulating layer 143 opposite to the device substrate 110 can be a flat surface.

The light-emitting device 130 of each pixel region PA can be independently controlled with the light-emitting device 130 of adjacent pixel region PA. For example, the first electrode 131 of each light-emitting device 130 can be spaced away from the first electrode 131 of adjacent light-emitting device 130. A bank insulating layer 114 can be disposed in a space between adjacent first electrodes 131. For example, the bank insulating layer 114 can cover an edge of each first electrode 131. The light-emitting layer 132 and the second electrode 133 of each light-emitting device 130 can be stacked on a portion of the corresponding first electrode 131 exposed by the bank insulating layer 114. The bank insulating layer 114 can include an insulating material. For example, the bank insulating layer 114 can include an organic material. The bank insulating layer 114 can be in direct contact with the over-coat layer 113 at the outside of each first electrode 131. The bank insulating layer 114 can include a material different from the over-coat layer 113.

The light-emitting device 130 of each pixel region PA can realize a color different from the light-emitting device 130 of adjacent pixel region PA. For example, the light-emitting layer 132 of each light-emitting device 130 can include a material different from the light-emitting layer 132 of adjacent light-emitting device 130. The light-emitting layer 132 of each light-emitting device 130 can be spaced away from the light-emitting layer 132 of adjacent light-emitting device 130. For example, the light-emitting layer 132 of each light-emitting device 130 can include an end portion on the bank insulating layer 114.

The second electrode 133 of each pixel region PA can be applied to the same voltage as the second electrode 133 of adjacent pixel region PA. For example, the second electrode 133 of each light-emitting device 130 can be electrically connected to the second electrode 133 of adjacent light-emitting device 130. The second electrode 133 of each light-emitting device 130 can include the same material as the second electrode 133 of adjacent light-emitting device 130. The second electrode 133 of each light-emitting device 130 can be in contact with the second electrode 133 of adjacent light-emitting device 130. For example, the second electrode 133 of each light-emitting device 130 can extend onto the bank insulating layer 114.

The light-emitting device 130 of each pixel region PA can have the same structure as the light-emitting device 130 of adjacent pixel region PA. For example, each of the light-emitting devices 130 can include the emitting function layer same as adjacent light-emitting device 130. The emitting function layer of each light-emitting device 130 can be connected to the emitting function layer of adjacent light-emitting device 130. For example, in the display panel 100 of the 3D display apparatus according to the embodiment of the present invention, at least one of the hole injection layer (HIL), the hole transmitting layer (HTL), the electron transmitting layer (ETL) and the electron injection layer (EIL) can extend onto the bank insulating layer 114.

An optical element 200 can be disposed on the display panel 100. The optical element 200 can be disposed on a path of the light emitted from the display panel 100. For example, the optical element 200 can be disposed on the encapsulating element 140 of the display panel 100. The optical element 200 can prevent the reflection of external light due to the display panel 100. For example, the optical element 200 can have a stacked structure of a quarter-wave plate (QWP) 210 and a linear polarizer 220.

An optical adhesive layer 230 can be disposed between the quarter-wave plate 210 and the linear polarizer 220. The optical adhesive layer 230 can be in direct contact with the quarter-wave plate 210 and the linear polarizer 220. The optical adhesive layer 230 can have a refractive index between those of the quarter-wave plate 210 and the linear polarizer 220. For example, the refractive index of the optical adhesive layer 230 can be the same as the refractive index of the quarter-wave plate 210 or the refractive index of the linear polarizer 220. Thus, in the optical element 200 of the 3D display apparatus according to the embodiment of the present invention, an air-gap can be not formed between the quarter-wave plate 210 and the linear polarizer 220. For example, in the optical element 200 of the 3D display apparatus according to the embodiment of the present invention, the rapid change in the refractive index between the quarter-wave plate 210 and the linear polarizer 220 can be prevented. Therefore, in the optical element 200 of the 3D display apparatus according to the embodiment of the present invention, the loss of the light due to the rapid change in the refractive index can be prevented.

A display adhesive layer 410 can be disposed between the display panel 100 and the optical element 200. The display adhesive layer 410 can be in direct contact with the display panel 100 and the optical element 200. For example, the quarter-wave plate 210 can be attached on the third encapsulating layer 143 by the display adhesive layer 410. The display adhesive layer 410 can have a refractive index between those of the third encapsulating layer 143 and the quarter-wave plate 210. For example, the refractive index of the display adhesive layer 410 can be the same as the refractive index of the third encapsulating layer 143 or the refractive index of the quarter-wave plate 210. The display adhesive layer 410 can include a material different from the optical adhesive layer 230. Thus, in the 3D display apparatus according to the embodiment of the present invention, the loss of the light due to the rapid change in the refractive index between the display panel 100 and the optical element 200 can be prevented.

Lenticular lenses 300 can be disposed on the optical element 200. The lenticular lenses 300 can realize a 3D image in a set viewing region using the light emitted from each light-emitting device 130 of the display panel 100. Each of the lenticular lenses 300 can extend in a direction. The extending direction of the lenticular lenses 300 can have an inclination with the first direction X. Each of the lenticular lenses 300 can include a portion overlapping with the pixel regions PA of the display panel 100.

A lens adhesive layer 420 can be disposed between the optical element 200 and the lenticular lenses 300. The lens adhesive layer 420 can be in direct contact with the optical element 200 and the lenticular lenses 300. For example, the lenticular lenses 300 can be attached to the linear polarizer 220 by the lens adhesive layer 420. The lens adhesive layer 420 can have a refractive index between those of the linear polarizer 220 and the lenticular lenses 300. For example, the refractive index of the lens adhesive layer 420 can be the same as the refractive index of the linear polarizer 220 or the refractive index of the lenticular lenses. The lens adhesive layer 420 can include a material different from the display adhesive layer 410. Thus, in the 3D display apparatus according to the embodiment of the present invention, the loss of the light due to the rapid change in the refractive index between the optical element 200 and the lenticular lenses 300 can be prevented.

A viewing angle control film 500 can be disposed on the lenticular lenses 300. The viewing angle control film 500 can block the light traveling toward the outside of the set viewing region by the lenticular lenses 300. For example, the viewing angle control film 500 can include a plurality of light-blocking patterns 530 between a first control substrate 510 and a second control substrate 520.

The first control substrate 510 and the second control substrate 520 can include an insulating material. The first control substrate 510 and the second control substrate 520 can include a transparent material. The first control substrate 510 and the second control substrate 520 can include a flexible material. For example, the first control substrate 510 and the second control substrate 520 can include plastic, such as poly-imide (PI).

Each of the plurality of light-blocking patterns 530 can be in direct contact with the first control substrate 510 and the second control substrate 520. For example, a height of each light-blocking pattern 530 can be the same as a distance between the first control substrate 510 and the second control substrate 520. The plurality of light-blocking patterns 530 can be spaced away from each other. The plurality of light-blocking patterns 530 can have regular intervals. For example, a pitch of the plurality of light-blocking patterns 530 can be constant. An angle of the light passing between the adjacent light-blocking patterns 530 can be adjusted by the height of each light-blocking pattern 530 and the pitch of the plurality of light-blocking patterns 530. Each of the plurality of light-blocking patterns 530 can extend in the first direction X. The lenticular lenses 300 can intersect each light-blocking pattern 530.

The display panel 100 and the viewing angle control film 500 can be bent in a direction. For example, the display panel 100 and the viewing angle control film 500 can have a certain curvature. The lenticular lenses 300 can have the same curvature as the display panel 100. A surface of the lenticular lenses 300 toward the viewing angle control film 500 can have semi-circular shape. For example, an air-gap AG overlapping with a boundary of the lenticular lenses 300 can be disposed between the lenticular lenses 300 and the viewing angle control film 500. Thus, in the 3D display apparatus according to the embodiment of the present invention, the diffusion of the light by the lenticular lenses 300 can be effectively performed.

The viewing angle control film 500 can be physically coupled with the display panel 100 and the lenticular lenses 300. For example, a fixing element 600 can be disposed on an edge of the display panel 100 and an edge of the viewing angle control film 500. The fixing element 600 can be in direct contact with the edge of the display panel 100 and the edge of the viewing angle control film 500. Thus, in the 3D display apparatus according to the embodiment of the present invention, the viewing angle control film 500 can be stably coupled with the display panel 100 and the lenticular lenses 300.

Figure 3:
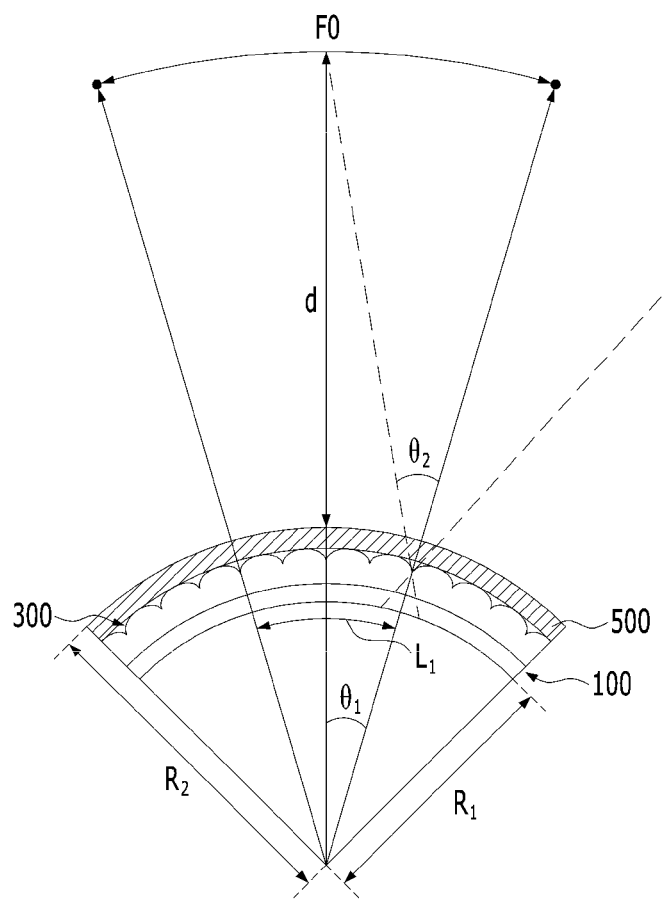
FIG. 3 is a view schematically showing a path of light in the 3D display apparatus according to the embodiment of the present invention.

FIG. 3 is a view schematically showing a path of light in the 3D display apparatus according to the embodiment of the present invention.

Referring to FIGS. 1 to 3, in the 3D display apparatus according to the embodiment of the present invention, the lenticular lenses 300 and the viewing angle control film 500 can be stacked on the display panel 100 having a curvature. The light emitted from each pixel region PA of the display panel 100 can realize the 3D image in the set viewing region F0 by passing through the lenticular lenses 300 and between the light-blocking patterns 530 of the viewing angle control film 500. When the field of view (FOV) of the set viewing region F0 is $2\theta_1$, the curvature radius of the lenticular lenses 300 is $R_2$, and a distance between the viewing angle control film 500 and the set viewing region F0 is d, $2\theta_2$, which is the field of view (FOV) of the viewing angle control film 500, can be derived by the following equation 1, wherein, $L_1$ is a length of the display panel 100 corresponding to the set viewing region F0, and the depth of the viewing angle control film 500 is negligible.

$$2 \times \theta_2 = 2 \times atan\left[\frac{(R_2 + d) \times \tan\left(\frac{L_1}{2 \times R_2}\right)}{d}\right] \quad \text{[equation 1]}$$

The angle of the light passing through the viewing angle control film 500 can be determined by the height h and the pitch p of the plurality of light-blocking patterns 530. For example, a viewing angle $\theta_3$ of the viewing angle control film 500 can be derived by the following equation 2.

$$\theta_3 = 2 \times atan\left(\frac{P}{h}\right) \quad \text{[equation 2]}$$

When the viewing angle θ3 of the viewing angle control film 500 is the same as the field of view (FOV) 202 of the viewing angle control film 500, a repetitive image may be not generated in the set viewing region F0. For example, when the plurality of light-blocking patterns 530 of the viewing angle control film 500 have the height h and the pitch p satisfying the following equation 3, the generation of the repetitive image in the set viewing region F0 can be prevented, wherein, p is the pitch of the plurality of light-blocking patterns, h is the height each of the plurality of light-blocking patterns, R2 is the curvature radius of the lenticular lenses, d is the distance between the viewing angle control film and the set viewing region, and L1 is the length of the display panel corresponding to the set viewing region.

$$\frac{p}{h} = \frac{(R_2 + d) \times \tan\left(\frac{L_1}{2 \times R_2}\right)}{d} \quad \text{[equation 3]}$$

Accordingly, the 3D display apparatus according to the embodiment of the present invention can include the lenticular lenses 300 and the viewing angle control film 500 which are stacked on the display panel 100, wherein the plurality of light-blocking patterns 530 of the viewing angle control film 500 can have the height and the pitch satisfying the equation 3. Thus, in the 3D display apparatus according to the embodiment of the present invention, the generation of the repetitive image in the set viewing region F0 can be prevented. Thereby, in the 3D display apparatus according to the embodiment of the present invention, the quality of the 3D image provided to the user can be improved.

Figure 4:
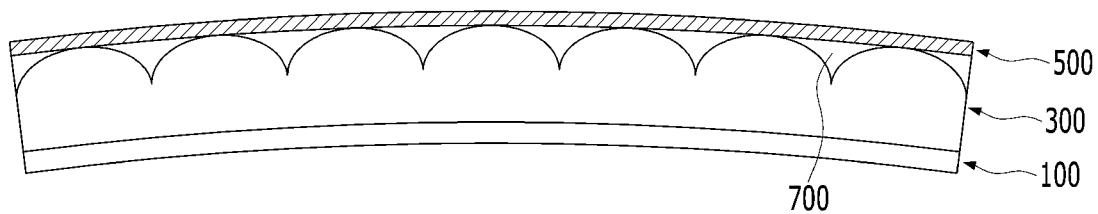
FIG. 4 is a view showing a 3D display apparatus according to another embodiment of the present invention.

The 3D display apparatus according to the embodiment of the present invention is described that the air-gap Ag is disposed between the lenticular lenses 300 and the viewing angle control film 500. However, in the 3D display apparatus according to another embodiment of the present invention, the boundary of the lenticular lenses 300 can be filled by a planarizing layer 700, as shown in FIG. 4. The viewing angle control film 500 can be in direct contact with the planarizing layer 700. For example, the viewing angle control film 500 can be coupled with the lenticular lenses 300 by the planarizing layer 700. Thus, in the 3D display apparatus according to another embodiment of the present invention, additional fixing element for fixing the viewing angle control film 500 can be not used. Therefore, in the 3D display apparatus according to another embodiment of the present invention, a process of coupling the display panel 100, the lenticular lenses 300 and the viewing angle control film 500 can be simplified.

Figure 5:
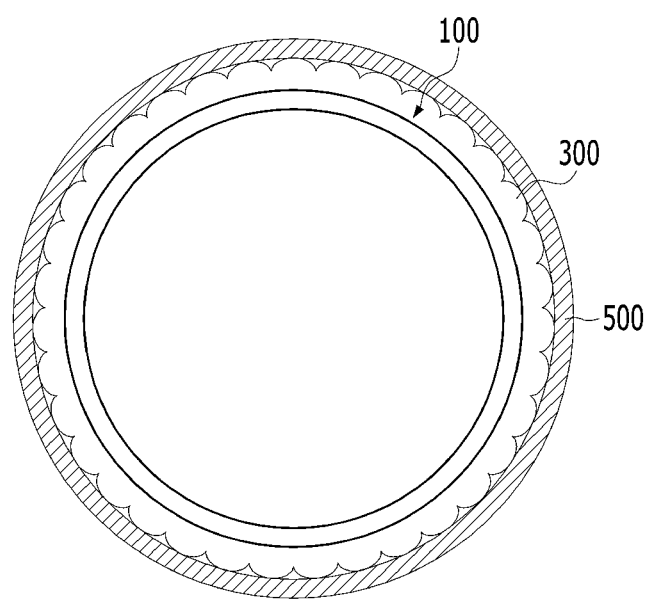
FIG. 5 is a view showing a 3D display apparatus according to still another embodiment of the present invention.

The 3D display apparatus according to the embodiment of the present invention is described that the display panel 100 and the viewing angle control film 500 are curved at a certain curvature. However, in the 3D display apparatus according to still another embodiment of the present invention, the display panel 100, the lenticular lenses 300 and the viewing angle control film 500 can have a cylindrical shape. For example, in the 3D display apparatus according to still another embodiment of the present invention, each of the display panel 100, the lenticular lenses 300 and the viewing angle control film 500 can have the cross-section of a circular shape, as shown in FIG. 5. For example, in the 3D display apparatus according to still another embodiment of the present invention, the 3D image can be expressed in all direction of 360°. The plurality of light-blocking patterns of the viewing angle control film 500 can have the height and the pitch satisfying the equation 3. Thus, in the 3D display apparatus according to still another embodiment of the present invention, the repetitive image can be not generated in the set viewing region according to the location of the user by the viewing angle control film 500. Thereby, in the 3D display apparatus according to still another embodiment of the present invention, the 3D image having excellent quality can be provided regardless of the user's location.

As a result, the 3D display apparatus according to the embodiments of the present invention can comprise the lenticular lenses and the viewing angle control film which are sequentially stacked on the display panel having a curvature, wherein the plurality of light-blocking patterns of the viewing angle control film can have the height and the pitch which are determined by the curvature radius of the lenticular lenses, the distance between the viewing angle control film and the set viewing region, and the length of the display panel corresponding to the set viewing region.

Thus, in the 3D display apparatus according to the embodiments of the present invention, the generation of the repetitive image in the set viewing region can be prevented. Thereby, in the 3D display apparatus according to the embodiments of the present invention, the quality of the 3D image provided to the user can be improved.

What is claimed is:

1. A three-dimensional (3D) display apparatus comprising:
    a display panel having a curvature;
    a viewing angle control film on the display panel, the viewing angle control film including a plurality of light-blocking patterns between a first control substrate and a second control substrate; and
    lenticular lenses between the display panel and the viewing angle control film,
    wherein a height and a pitch of the plurality of light-blocking patterns satisfy the following equation:

$$\frac{p}{h} = \frac{(R_2 + d) \times \tan\left(\frac{L_1}{2 \times R_2}\right)}{d}$$

wherein, p is a pitch of the plurality of light-blocking patterns, h is a height of each of the plurality of light-blocking patterns, $R_2$ is a curvature radius of the lenticular lenses, d is a distance between the viewing angle control film and a set viewing region, and $L_1$ is a length of the display panel corresponding to the set viewing region.

2. The 3D display apparatus according to claim 1, wherein the lenticular lenses and the viewing angle control film have the same curvature as the display panel.

3. The 3D display apparatus according to claim 1, further comprising:
    an optical element between the display panel and the lenticular lenses;
    a display adhesive layer between the display panel and the optical element; and
    a lens adhesive layer between the optical element and the lenticular lenses.

4. The 3D display apparatus according to claim 3, wherein the display adhesive layer is in contact with the display panel and the optical element, and
    the lens adhesive layer is in contact with the optical element and the lenticular lenses.

5. The 3D display apparatus according to claim 3, wherein the lens adhesive layer includes a material different from the display adhesive layer.

6. The 3D display apparatus according to claim 1, wherein each of the plurality of light-blocking patterns is in contact with the first control substrate and the second control substrate.

7. The 3D display apparatus according to claim 1, further comprising:
    an air-gap between the lenticular lenses and the viewing angle control film.

8. The 3D display apparatus according to claim 7, wherein the air-gap overlaps a boundary of the lenticular lenses.

9. The 3D display apparatus according to claim 7, further comprising:

a fixing element being in contact with an edge of the display panel and an edge of the viewing angle control film.

\* \* \* \* \*